United States Patent
Guigné et al.

(10) Patent No.: US 7,830,748 B2
(45) Date of Patent: *Nov. 9, 2010

(54) METHOD FOR ACOUSTIC IMAGING OF THE EARTH'S SUBSURFACE USING A FIXED POSITION SENSOR ARRAY AND BEAM STEERING

(75) Inventors: Jacques Y. Guigné, Paradise (CA); Nicholas G. Pace, Bath (GB)

(73) Assignee: PanGeo Subsea, Inc., St. John's, NL (CA)

( * ) Notice: Subject to any disclaimer, the term of this patent is extended or adjusted under 35 U.S.C. 154(b) by 295 days.

This patent is subject to a terminal disclaimer.

(21) Appl. No.: 12/057,414

(22) Filed: Mar. 28, 2008

(65) Prior Publication Data
US 2009/0122643 A1  May 14, 2009

Related U.S. Application Data

(60) Provisional application No. 60/987,784, filed on Nov. 14, 2007.

(51) Int. Cl.
*G01V 1/28* (2006.01)
(52) U.S. Cl. .................. 367/58; 367/56; 181/108; 181/112
(58) Field of Classification Search .................. 367/15, 367/56, 58; 181/108, 110, 112
See application file for complete search history.

(56) References Cited

U.S. PATENT DOCUMENTS

| | | | | |
|---|---|---|---|---|
| 4,048,612 A | * | 9/1977 | Lawyer | 367/56 |
| 4,803,668 A | * | 2/1989 | Berryhill et al. | 367/58 |
| 4,835,745 A | * | 5/1989 | Young et al. | 367/56 |
| 4,970,697 A | * | 11/1990 | Earley et al. | 181/112 |
| 5,511,039 A | | 4/1996 | Flentge | |
| 5,532,976 A | * | 7/1996 | Schneider, Jr. | 367/38 |
| 6,009,042 A | | 12/1999 | Workman et al. | |
| 6,044,040 A | * | 3/2000 | Holland | 367/56 |
| 7,656,746 B2 | * | 2/2010 | De Kok et al. | 367/19 |
| 2007/0165486 A1 | | 7/2007 | Moldoveanu et al. | |

OTHER PUBLICATIONS

International Search Authority Written Opinion Application No. PCT/CA08/01806.
International Search Report Application No. PCT/CA08/01806.
International Preliminary Report of Patentability Application No. PCT/CA08/01806.

* cited by examiner

*Primary Examiner*—Ian J Lobo
(74) *Attorney, Agent, or Firm*—Richard A. Fagin (57) ABSTRACT

A method for seismic surveying includes disposing a plurality of seismic sensors in a selected pattern above an area of the Earth's subsurface to be evaluated. A seismic energy source is repeatedly actuated proximate the seismic sensors. Signals generated by the seismic sensors, indexed in time with respect to each actuation of the seismic energy source are recorded. The recorded signals are processed to generate an image corresponding to at least one point in the subsurface. The processing includes stacking recordings from each sensor for a plurality of actuations of the source and beam steering a response of the seismic sensors such that the at least one point is equivalent to a focal point of a response of the plurality of sensors.

17 Claims, 4 Drawing Sheets

METHOD FOR ACOUSTIC IMAGING OF THE EARTH'S SUBSURFACE USING A FIXED POSITION SENSOR ARRAY AND BEAM STEERING

CROSS-REFERENCE TO RELATED APPLICATIONS

Priority is claimed from U.S. Provisional Application No. 60/987,784 filed on Nov. 14, 2007.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic evaluation of formations in the Earth's subsurface. More specifically, the invention relates to methods for determining seismic attributes in specific formations in the subsurface to a relatively high lateral and vertical resolution.

2. Background Art

Seismic surveying techniques are known in the art for determining structure and composition of rock formations in the Earth's subsurface. Reflection seismic techniques known in the art include deploying an array of seismic sensors above a part of the subsurface to be evaluated. The sensor array may be deployed on the land surface, or in marine surveys may be towed by a vessel near the surface of a body of water or may be deployed in a selected pattern on the water bottom. The array is typically rectilinear in shape and has substantially uniform spacing between individual sensors in the array. A seismic energy source is deployed near the array of seismic sensors and is actuated at selected times. Signals are detected by the sensors in the array and are recorded. The recordings are typically indexed with respect to the actuation time of the seismic energy source. The seismic signals typically include events caused by seismic energy reflecting from acoustic impedance boundaries in the subsurface. The time indexed records from each sensor are then processed to generate images of the rock formations, and to evaluate their petrophysical properties such as fluid content, mineral composition and fractional volume of pore space ("porosity").

Seismic surveying known in the art has relatively limited vertical and lateral resolution. Resolution limitations result from the fact that the Earth's subsurface functions as a low pass filter to seismic energy. Typically only relatively low frequency seismic energy is able to travel from the source, through the subsurface and back to the seismic sensors having retained enough energy to be detected above the noise. The frequencies are usually below 80 Hz. Images of the subsurface can be formed by summing or "stacking" of the recorded signals in various manners and by a process known as migration. The vertical resolution obtained is determined by the dominant frequency associated with penetration to the depth in the subsurface of the rock formations being analyzed. The lateral resolution obtained depends on the aperture size and sensor spacing used for the signal collection of that portion of the data that is migrated. Various schemes are employed for the extraction of velocity versus depth and for geological interpretation. One example of a migration technique is described in U.S. Pat. No. 6,466,873 issued to Ren et al.

When seismic surveys are conducted with large arrays of sensors deployed on the seabed, for example, the lateral resolution of the images formed by migration techniques will again be determined by the selected sensor array aperture size and sensor spacing. The array aperture and sensor spacing ultimately will be limited by the cost in data processing time. Each point in the resulting images results from an aperture that has been moved along a much larger array of sensors and thus the image point is a specular point. Such fixed arrays are used for various reservoir studies.

It is known in the art to perform seismic surveys repeatedly over a same area of the Earth's subsurface in order to determine changes in spatial distribution of fluids in the subsurface formations. Changes in spatial distribution of fluid over time can result from extraction of fluids, for example, producing hydrocarbon from the formations. It is desirable to have a method for seismic surveying that provides increased resolution as compared with techniques known in the art, for among other purposes, to be able to determine more precisely changes in spatial distribution of fluids disposed in subsurface rock formation as fluids are extracted from such formations.

SUMMARY OF THE INVENTION

A method for seismic surveying according to one aspect of the invention includes disposing a plurality of seismic sensors in a selected pattern above an area of the Earth's subsurface to be evaluated. A seismic energy source is repeatedly actuated proximate the seismic sensors. Signals generated by the seismic sensors in response to detected seismic energy, indexed in time with respect to each actuation of the seismic energy source are recorded. The recorded signals are processed to generate an image corresponding to at least one point in the subsurface. The processing includes stacking recordings from each sensor for a plurality of actuations of the source and beam steering a response of the seismic sensors such that the at least one point is equivalent to a focal point of a response of the plurality of sensors.

Other aspects and advantages of the invention will be apparent from the following description and the appended claims.

DETAILED DESCRIPTION

An objective of methods according to the present invention is to provide a localized examination of subsurface Earth structures with higher resolution (both laterally and vertically) than is typically possible using conventional seismic surveying. In some examples, the localized examination may be repeated at selected times to determine changes in spatial distribution of fluids in subsurface rock formations. Various examples of methods according to the invention may provide such enhanced resolution examinations at depths of 1.0 km to 3.5 km below the Earth's surface, or in examples in marine environments within a similar range of distances below the water bottom. The particular examined volume within the Earth's subsurface to be evaluated may be selected from prior, conventional seismic surveys, for example. In methods according to the invention relatively high frequency (as contrasted with conventional seismic) seismic energy is used, and coherent stacking from multiple actuations of a seismic energy source is used to mitigate the attenuation of such higher frequency energy which occurs as a result of the acoustic properties of the subsurface rock formations. The vertical resolution of a seismic survey made according to various examples of the invention can thus be better than that obtainable from conventional seismic surveys.

The lateral resolution of surveys made according to the invention depends, as is the case for conventional seismic surveys, on the aperture size of an array of seismic sensor used. Data processing according to the invention, however, is relatively fast as contrasted with convention seismic data processing because it is based on the steering of focused beams, rather than on depth or time migration analysis. Methods according to the invention thus can provide the ability to monitor subsurface reservoirs during production using time-lapse imaging, allowing a better understanding of the movement of fluids in such subsurface reservoirs.

Figure 1:
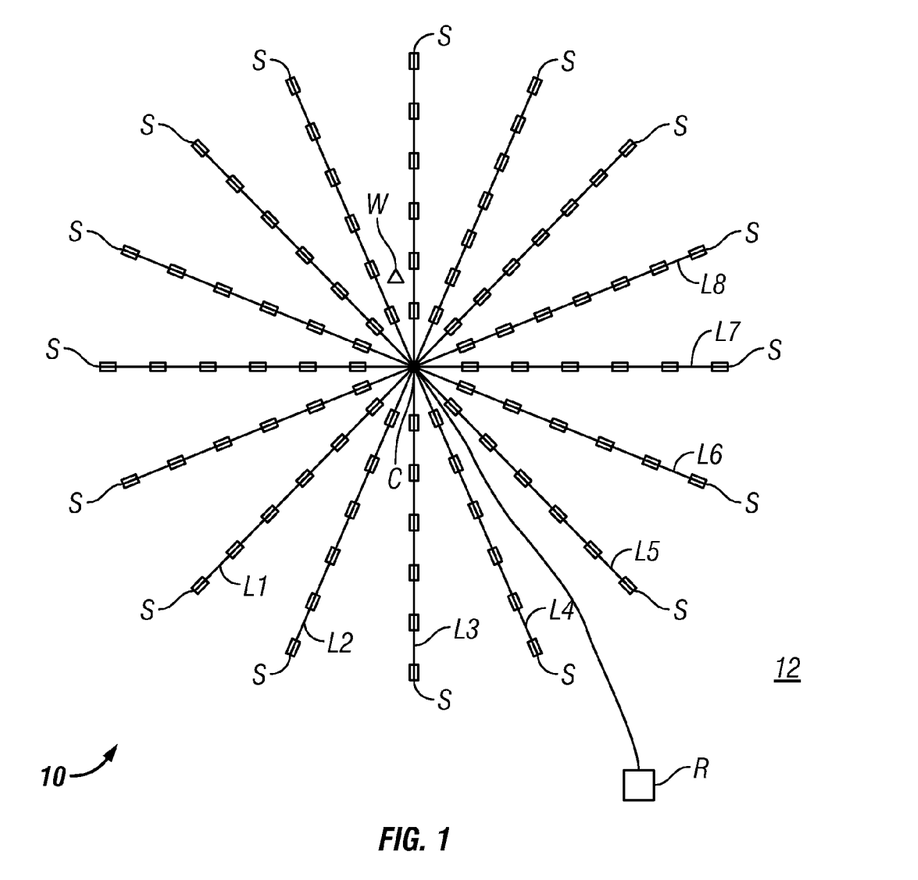
FIG. 1 shows an example of a sensor array used for subsurface imaging according to the invention.

An example seismic sensor array that may be used with the invention is shown schematically at 10 in FIG. 1. In the example shown in FIG. 1, the seismic sensor array 10 may be disposed on the bottom of a body of water 12 such as a lake or the ocean. The seismic sensor array 10 may include individual seismic sensor cables L1 through L8. The cables L1 through L8 may include a plurality of spaced apart seismic sensor modules S disposed along the length of each seismic sensor cable L1-L8. Each of the seismic sensor modules S may include a so-called "four-component" seismic sensor (not shown separately). "Four-component" seismic sensors typically include three, orthogonally oriented particle motion responsive sensors such as geophones or accelerometers, and a substantially collocated pressure or pressure time gradient responsive sensor such as a hydrophone. See, for example, U.S. Pat. No. 5,774,417 issued to Corrigan et al. for an example of such four component seismic sensors used in a sensor cable for deployment on the bottom of a body of water. Examples of the longitudinal spacing between sensor modules and the number of the sensor modules S on each seismic sensor cable L1-L8 will be further explained below with reference to FIG. 2. Each seismic sensor (not shown separately) in each sensor module S may generate electrical and/or optical signals related to the parameter being measured (e.g., velocity, acceleration, pressure or pressure time gradient). The sensor signals may be communicated according to the type of sensor output signal to a recording unit R. The recording unit R may be disposed on the water bottom, or in a buoy near the water surface for signal record storage and later retrieval.

A seismic energy source W, which may be an air gun array or water gun array, or other suitable sources, such as magnetostrictive or piezoelectric transducers may be disposed proximate the center C of the sensor array 10. The source W is actuated at selected times, and a time indexed record of the signals produced by each sensor in each module S can be recorded in the recording unit R for later analysis. Particular characteristics of the seismic energy source W will be further explained below.

The seismic sensor cables L1-L8 may be arranged in a radial pattern as shown in FIG. 1. The seismic sensor cables L1-L8 in the present example may be symmetrically arranged about the center point C of the array 10 and angularly displaced from each other by an angle of about 22½ degrees. In other examples, fewer or more cables may be used than is shown in FIG. 1. It is contemplated that in such other examples the angular displacement between each of the cables will be approximately equal, however equal angular displacement between sensor cables is not a limit on the scope of the present invention. The radial sensor cable arrangement shown in FIG. 1 may be advantageous in calculated beam steering of the sensor response. However, other geometric arrangements may be used that can be beam steered according to the invention.

Figure 1A:
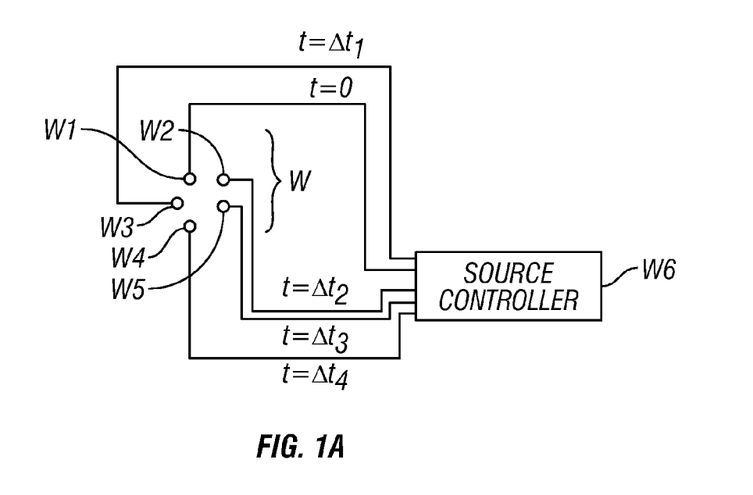
FIG. 1A shows a seismic energy source array that may be used with the array shown in FIG. 1.

FIG. 1A shows an example of the seismic energy source W in more detail. The source W may consist of a plurality of individual air guns or water guns or other suitable seismic energy sources such as explained above, shown at W1 through W5 arranged in a small-diameter, generally circular pattern. The individual sources W1-W5 may be actuated by a source controller W6, which may be in operative communication with the recording unit (R in FIG. 1) so that the signal recordings may be time indexed to the actuation time of the source W. In the present example, the source controller W6 may be configured to successively, individually (or in subsets or subcombinations) actuate each source W1-W5 at a selected time delay (which may be zero or any other selected time delay) after the actuation of the first one of the sources W1-W5. The time delay may be selected such that the energy output of the array of sources W1-W5 is oriented substantially along a selected direction. In such examples, the directivity of the source W may be used to further illuminate subsurface features identified during signal processing or otherwise. Such specific illumination will be further explained below with reference to FIG. 3.

A longitudinal spacing between seismic sensor modules on each sensor cable, and a number of such seismic sensor modules on each cable may be determined by the frequency range over which a seismic analysis of the subsurface rock formations is to be performed. Such seismic frequencies, of course, must have been radiated by the seismic energy source. Selection of suitable frequency for the seismic energy source will be explained in more detail below. The longitudinal spacing between seismic sensor modules forming the receiver array is preferably selected such that for a particular seismic frequency the spacing should not be greater than about one-half the seismic energy wavelength. At each frequency an example cable length may be about 80 to 120 wavelengths of the longest wavelength seismic energy frequency. Thus, it is possible to use an array having sensor cables of overall length 120 wavelengths at the lowest frequency, but variable longitudinal spacing along each cable between the seismic sensor modules, so that the overall array will include 120 wavelength-long sensor arrays at higher frequencies with a half-wavelength spacing at such higher frequencies. The sound speed (seismic velocity) used to determine the wavelength is that within the rock formations near the water bottom (or the Earth's surface in land based surveys).

Figure 2:
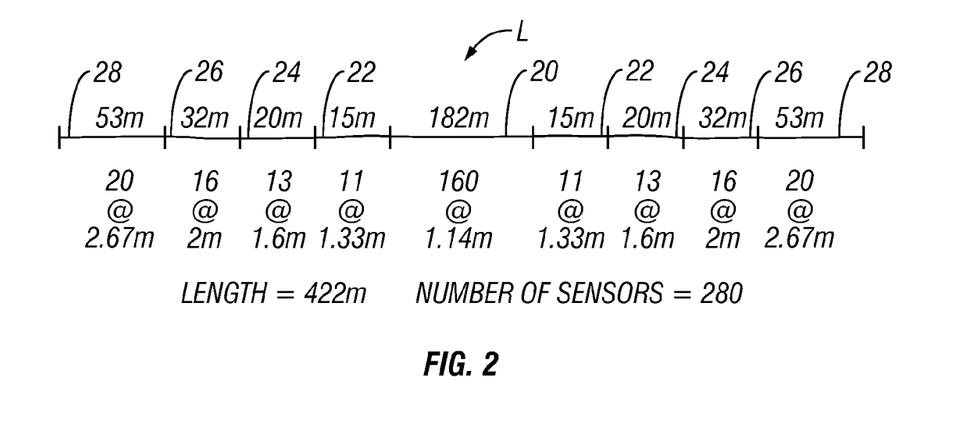
FIG. 2 shows an example of seismic sensor distribution along one line of an array such as shown in FIG. 1.

An example of possible longitudinal spacing between seismic sensor modules (S in FIG. 1) and numbers of such seismic sensor modules is shown schematically in FIG. 2. The seismic sensor modules (S in FIG. 1) may be more closely spaced along each cable L nearest the center point (C in FIG. 1) of the array (10 in FIG. 1), becoming more sparsely spaced toward the longitudinal end of each cable L. In the example shown in FIG. 2, a centermost portion 10 of the cable L can be about 182 meters long and have 160 sensor modules spaced apart from each other by about 1.14 meters. Laterally adjacent on either end of the centermost portion 20, a first lateral portion 22 may include 11 sensor modules spaced apart from each other by about 1.33 meters and have an overall length of about 15 meters. A second lateral portion 24 may be disposed laterally adjacent each first portion 22 and have 13 sensor modules spaced about 1.6 meters from each other and have overall length of about 20 meters. Respective third 26 and fourth 28 lateral portions may be adjacent as shown in FIG. 2 and include, respectively, 16 and 20 sensor modules spaced apart by 2 and 2.67 meters, and have overall length of 32 and 53 meters. Overall, each cable L in the array (10 in FIG. 1) may include 280 sensor modules and have length of about 422 meters. Other lengths and sensor module spacings may be used. It is contemplated that the sensor module spacing in the present example, when used in conjunction with a seismic energy source (W in FIG. 1) having substantial energy in a frequency range of about 300 to 700 Hz, will provide high resolution images at depths below the water bottom of 1 to 3 kilometers. The lateral resolution of the measurements made by the array will increase as the length and the number of sensor modules on each cable L is increased. Vertical resolution of the measurements made by the array is related to the frequency content of the seismic energy.

Figure 3:
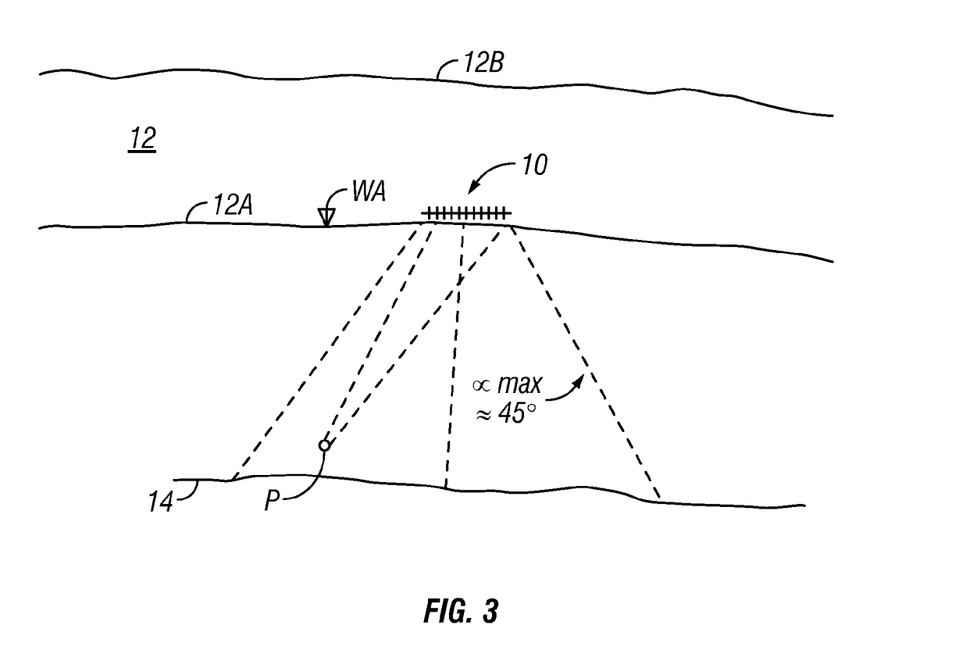
FIG. 3 shows a cross section of the subsurface to illustrate lateral evaluation capability of an array such as shown in FIG. 1.

Referring to FIG. 3, the sensor array 10 is shown disposed on the bottom 12A of the body of water 12. The water top is shown at 12B. Methods according to the invention may provide increased resolution images of subsurface formations, such as shown at 14, and may provide the capability to image within an aperture defined by an angle shown at α in FIG. 3. It is believed high resolution images may be obtained at angles of 45 degrees or more using methods of the present invention.

In methods according to the invention, the seismic energy source (W in FIG. 1) may be of a type to provide substantially higher frequency energy than is used in conventional reflection seismic surveys. As will be explained below, in methods according to the invention the fact that the source W and the array 10 are stationary provides that the source W may be actuated repeatedly so that attenuation of higher frequency energy by the subsurface formations may be alleviated by summing or stacking signals from the repeated actuations.

In selecting a frequency output for the seismic energy source (W in FIG. 1) the following may be considered. A reasonable expectation for attenuation of the seismic energy as it moves through the rock formations would be about 0.1 dB attenuation per wavelength of the seismic energy as is emanates from the source (W in FIG. 1). Table 1 shows a relationship between seismic energy attenuation and center frequency of the seismic energy, and provides guidance as to how much signal gain may be required at higher frequencies in order to have similar reflection signal strength as that of a conventional seismic survey. Conventional seismic surveys typically have at most about 120 Hz center frequency seismic energy, although in practice a more common center frequency range is about 50 to 80 Hz. The attenuation to 1000 m depth below the Earth's surface (or the water bottom) for a seismic energy velocity of 3000 meters per second can be calculated as (2*1000*120/3000)*0.1=8 dB. To a depth of 3500 m the corresponding attenuation is about 28 dB.

TABLE 1

| Freq Hz | Wavelength (m) | Two way Attenuation to 1000 m (dB) | Two way Attenuation to 2000 m (dB) | Two way Attenuation to 3500 m (dB) | Gain needed for focused survey over conventional seismic survey (dB) | | |
|---|---|---|---|---|---|---|---|
| | | | | | 1000 m (7 dB spreading gain) | 2000 m (4 dB spreading gain) | 3500 m (2 dB spreading gain) |
| 120 | 25 | 8 | 16 | 28 | | | |
| 200 | 15 | 13 | 26 | 46 | −2 | 6 | 16 |
| 300 | 10 | 20 | 40 | 70 | 5 | 20 | 40 |
| 400 | 7.5 | 27 | 54 | 94 | 12 | 34 | 64 |
| 500 | 6 | 33 | 66 | 115 | 18 | 46 | 85 |
| 600 | 5 | 40 | 80 | 140 | 25 | 60 | 110 |
| 700 | 4.3 | 47 | 94 | 164 | 32 | 74 | 134 |

The purpose of selecting a range of frequencies which is higher than that used for conventional seismic surveys, is to increase the vertical resolution and to maintain or increase the lateral resolution of the resulting seismic data while benefiting from the practical aspects of physically smaller sensor array apertures. Choosing a range of frequencies for which seismic data from various depths down to 3500 m and beyond can be obtained requires consideration of a number of factors. Of great importance is the attenuation rate of the seismic energy, as suggested above. Attenuation may be quantified in dB attenuation per wavelength of energy travel. It is known in the art that satisfactory seismic survey results may be obtained when the attenuation is between about 0.1 and 0.16 dB per wavelength. The seismic signal returned to the receivers (sensors) must be sufficiently high amplitude above the ambient noise, for example about 10 dB above the noise, for the seismic signals to be useful for subsurface evaluation. The foregoing relationship between the seismic signal amplitude and the ambient noise is termed the signal to noise ratio and it is related to the seismic energy source strength, the attenuation, the seismic energy center frequency, the seismic energy bandwidth around the center frequency, the geometrical spreading loss, the number of receiving sensors and the prevailing ambient noise.

Figure 4:
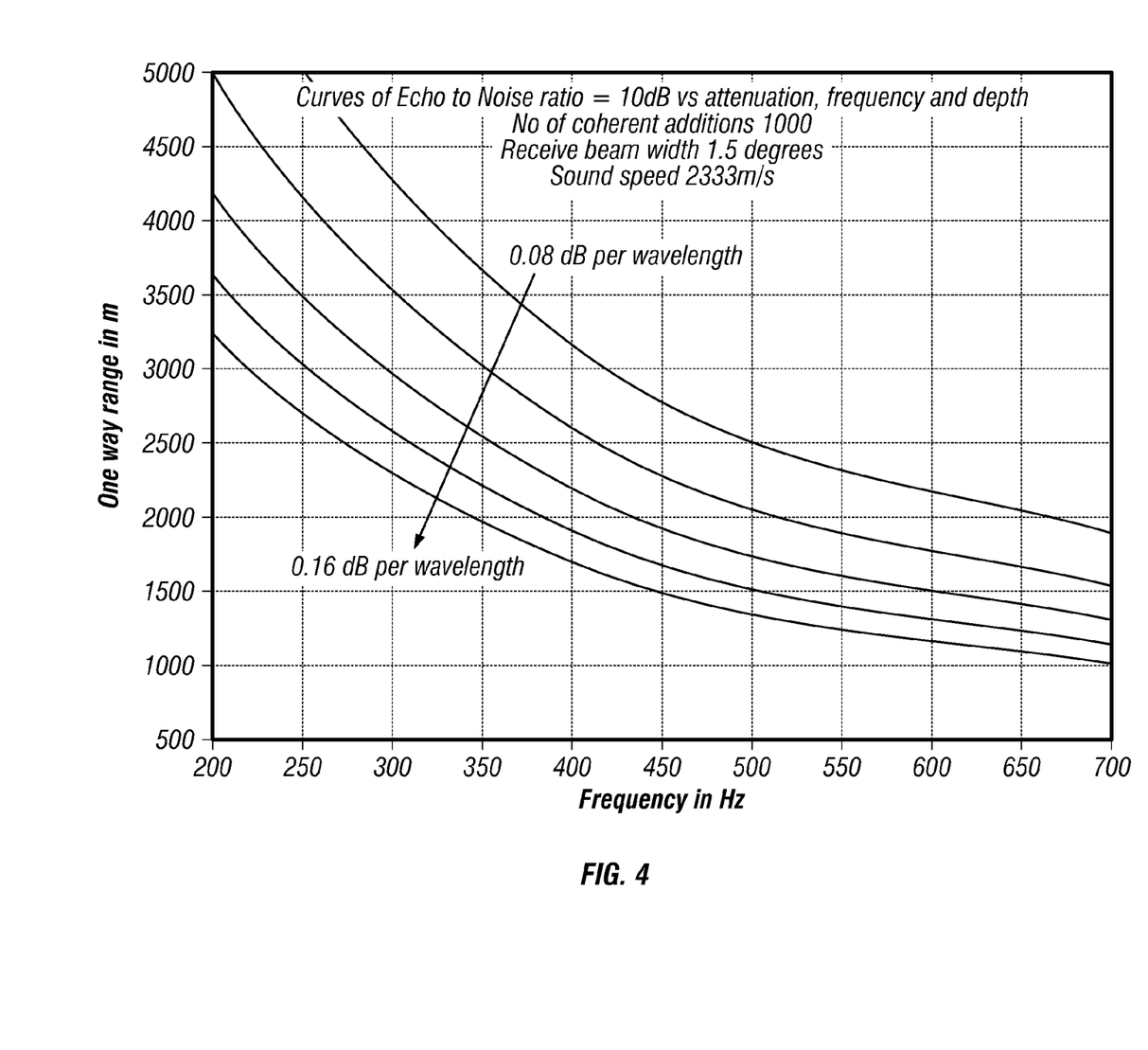
FIG. 4 is a graph of seismic signal amplitude to noise ratio for various attenuation rates with respect to frequency and acoustic energy travel length.

FIG. 4 shows a graph of one way seismic energy travel path length (related to the depth to which evaluation may be performed in the subsurface) that will result in signal to noise ratio of 10 dB for various seismic energy center frequencies. Each curve in FIG. 4 represents a unique value of attenuation (in dB per wavelength ranging from 0.08 to 0.16 in 0.02 increments). In generating the curves in the graph in FIG. 1, the seismic energy speed was set at 2333 m/s, the beam width of the received seismic energy was set at 1.5 degrees, and recordings from 1000 actuations of the seismic energy source were combined or stacked. In a method according to the invention, because the array (10 in FIG. 1) and the seismic energy source W are substantially stationary as explained above, the seismic signals obtained from a plurality of actuations of the seismic source can be added together or stacked to provide gains in signal to noise.

Figure 5:
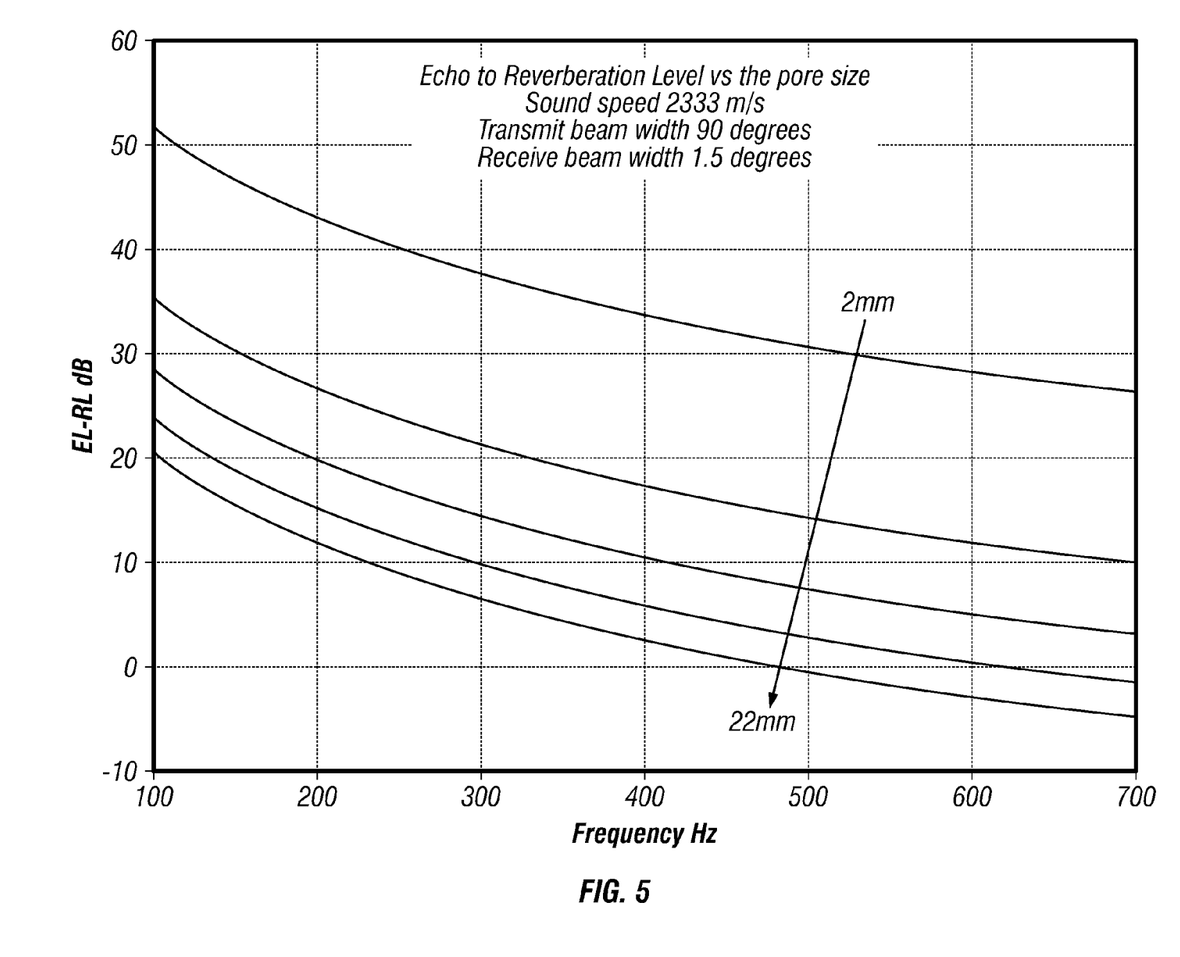
FIG. 5 is a graph of seismic signal to reverberation amplitude for various pore sizes with respect to frequency and acoustic energy travel length.

In addition to the signal to noise ratio, another factor that must be considered is the signal to reverberation ratio. The desired seismic signal is associated with the signal returned from that portion of the subsurface environment for which the receiving array of sensors has been focused and steered (explained further below). At the same time as the desired seismic signal, other signals are returned from the subsurface due to scatter from within a depth "shell" of thickness determined by the bandwidth of the seismic energy and subtending a solid angle dependent on the illumination and weighted in angle by the seismic sensor array beam pattern. The sum of all these signals constitutes what is known as reverberation. FIG. 5 shows example calculations of reverberation where the reverberation is due to scatter by pores in the subsurface formations. As an example comparison with the graph shown in FIG. 4, at 300 Hz, for attenuation of 0.16 dB per wavelength, the signal to noise ratio for stacked signals from 1000 source actuations would be 10 dB for an echo from a weak interface of impedance contrast 0.01 at a depth of 2250 m. For the same situation, FIG. 5 shows the signal to reverberation ratio would be 10 dB less than the signal to noise ratio for scatter from pores having an average size of 7 mm. The results shown in FIG. 4 and FIG. 5 are for calculations based on simple models but are indicative of underlying fundamental limitations to the method of the invention. The signal to noise increase provided by stacking signals from repeated actuations of the source are important to the operation of the invention. As an example, the two-way seismic energy travel time to a formation depth of 3500 m is about 2.5 seconds for a seismic velocity of 3000 meters per second. The seismic energy source may then be actuated repeatedly every 3 seconds for a total time duration of about 3 hours. The gain thus provided would be 10 log (3*60*60/3)=35 dB. If the total time interval is doubled to 6 hours the gain would be about 38 dB. Any further doubling of the time interval would add 3 dB. It should also be noted that further gain of 6 dB is provided when combined three component particle motion-plus pressure-responsive sensors are used, as contrasted with pressure-responsive sensors (hydrophones) are used alone as explained with reference to FIG. 4.

While the signal to noise may be improved by coherent summations or stacking, the signal to reverberation may be improved by increasing the directivity of the source. In some examples, and as explained above with reference to FIG. 1A, a steered source may be used, designing appropriate shading procedures for the receive beam to reduce the sidelobes and by increasing the analysis bandwidth from the $\frac{1}{3}^{rd}$ octave value known in the art.

The use of prior knowledge of the velocity structure of the subsurface is important to successfully steer and focus the seismic sensor array beams. Iterative focusing strategies may be used to enhance and improve the focusing and thereby further improve determination of the spatial distribution of seismic properties in the subsurface.

A further application of the invention is in the investigation of the upper layers of the seabed. Placing the seismic energy sources on the seabed at various distances from the sensor array can also be used to record and interpret surface waves. With the acoustic or elastic source deployed at or near to the seabed, the wavefield will contain significant, high-energy surface waves. These waves propagate radially from the source within the uppermost sediment layers and penetrate typically about one shear-wave length within the subsurface, and are closely related to shear waves. As contrasted with body waves, surface waves exhibit distinct dispersive natures and propagation velocities with frequency dependencies. The occurrence of multiple surface wave modes at particular frequencies in vertically stratified media can then be used to obtain an accurate geophysical model of the uppermost layers in the subsurface to a depth of tens of meters in the subsurface. Such models are of great value for geohazard assessment, geotechnical characterization and offshore engineering purposes, which are important for risk assessment and mitigation within offshore industry practices.

In addition to recording the compressional wave arrivals, the method will also have the capability to record shear wave arrivals. Such data can be inverted as mentioned above and knowledge of the ratio of compressional to shear wave speeds is of great use in the geophysical interpretation.

If the source (W in FIG. 1) output for the survey arrangement shown in FIG. 1 is reasonably similar to that used in a conventional seismic survey, then for a depth in the subsurface of 1000 m, a frequency of 700 Hz would need to have a gain of 32 dB in order to have similar signal strength to a 120 Hz center frequency conventional seismic survey. For penetration depth in the subsurface to 3500 m, a frequency of 300 Hz would need to have a gain of 40 dB over that of a conventional 120 Hz seismic survey. In a method according to the present invention, as stated above because the source (W in FIG. 1) and the array (10 in FIG. 1) are stationary, the required gain may be provided by repetitively actuating the source (W in FIG. 1) and summing or stacking recordings made for each actuation for each sensor in each sensor module (S in FIG. 1).

As an example, the two-way seismic energy travel time to a formation depth of 3500 m is about 2.5 seconds for a seismic velocity of 3000 meters per second. The source may then be actuated repeatedly every 3 seconds for a total time duration of about 3 hours. The gain thus provided would be 10 log (3*60*60/3)=35 dB. If the total time interval is doubled to 6 hours the gain would be about 38 dB. Any further doubling of the time interval would add 3 dB. It should also be noted that further gain of 6 dB is provided as contrasted with pressure sensors (hydrophones) used alone when vector-velocity-plus-pressure sensors are used as explained with reference to FIG. 1.

Based on the foregoing analysis, together with detailed studies of the expected noise and reverberation for a range of frequencies, receiving array processing schemes, available seismic source strengths and dispositions, a reasonable practical choice of the source frequency for penetration to 1000 m below the water bottom is up to 700 Hz, while for penetration to 3500 m the maximum frequency, depending on prevailing conditions could be as high about 300 Hz.

Four-component sensors, if such as used, provide three components of the vector acoustic intensity together with the acoustic pressure. Thus, in contrast to pressure-only sensors, each sensor has its own beam pattern, and in marine surveys in particular, allows for the significant discrimination against energy arriving from above the seabed. (This includes the sea surface reflections of energy arriving from the seabed at earlier times.) Using velocity vector and pressure as the received signals can provide, as explained above, additional 6 dB gain over the use of pressure sensors alone in the forward direction while providing substantial front to back discrimination.

In a method according to the present invention, signals from the seismic sensor array 10 may be processed to focus the sensitivity of the array 10 to any selected focal point (e.g., P) in the subsurface. Such focusing may be performed, for example, by applying a suitable time delay to the signals recorded by each individual sensor in the array 10. The time delay may be selected, for example, such that arrival time of seismic energy from each selected point P to each seismic sensor is substantially identical, or may be selected to create the effect of a plane wave emanating from the focal point P. Because the spatial distribution of seismic velocities in the subsurface may be determined beforehand using conventional seismic velocity analysis, the time delay may be accurately determined prior to conducting a survey using the array 10 or prior to processing the signal recordings. During the seismic survey technique according to the invention, a plurality of individual focal points may be selected throughout the area of the subsurface that is being examined.

If during the seismic survey acquisition and/or procedure a point of interest (e.g., at P) is located in the subsurface, either or both of the following supplemental acoustic illumination procedures may be performed. First, the time delay for operating each energy source in the source array (see FIG. 1A) may be selected to direct the output of the source (W in FIG. 1) toward the point of interest. Alternatively, or in addition, an auxiliary source WA may be disposed at a position on the water bottom substantially directly above the point of interest in order to obtain zero incidence illumination of the point of interest.

The method described above may be repeated at selected times in order to determine, for example, changes in spatial distribution of fluids within rock formations in the subsurface. Such procedure may provide higher resolution mapping of the spatial distribution than conventional "4D" seismic surveying, and may provide earlier detection of subsurface reservoir damage such as water "coning" or unintended fluid movement resulting from permeability anistotropy.

An example data acquisition and operational method may be described as follows. If 3D seismic data are available first it is desirable to examine the data for an area above the subsurface volume to be analyzed. Such examination may provide a location for the sensor array (10 in FIG. 1) to be positioned.

Next the sensors in the sensor modules (S in FIG. 1) may be calibrated by transmitting seismic signals laterally along the array. Next may be determining the maximum and minimum directive response for sensor module. As explained above, in some examples each sensor module may include a pressure responsive sensor and a three component particle motion responsive sensor. Directivity distribution of the sensor response may be determined.

After calibration of the sensors in the various modules, data acquisition may be performed. As explained above, for certain depth ranges in the subsurface and for certain desired frequency response, it may be desirable to record signals from as many as 1,000 successive actuations of the seismic energy source (W in FIG. 1).

Once a sufficient number of source "shots" are acquired and summed or "stacked", the signal to noise ratio with respect to time for the recorded signals may be examined to ensure sufficient signal levels are present for forming beams. If the signal level is too low stacking of signals from individual actuations can be continued. As explained above, it is desirable to have about 10 dB signal above the noise floor The existing 3D seismic data may also be used to estimate seismic velocity distribution for the site. Using the 3D velocity distribution from seismic data, a ray tracing model of the beams steered at depth may be initiated. The ray tracing model may correct for the influence of the near surface formations on the beam profile. The ray modeling will show the distortions of the beam caused by specific geology, which then can be used to correct for the effects of a particular set of near surface formations.

The sensor data in the near surface time histories can be examined to identify densely-sampled, multi-component seismic data surface waves. With the seismic energy source deployed at or near to the water bottom, the detected seismic signals (wavefield" will contain significant, high-energy surface waves. Because of the arrangement of seismic source and sensors as shown in FIG. 1, such surface waves may propagate radially along the directions of the "arms" of the sensor array (e.g., sensor lines L1-L8 in FIG. 1). Such radially propagated seismic waves within the uppermost formation layers may be processed by analyzing their distinct dispersive nature. Dispersion may be processed by accounting for changes in surface wave velocity profile because surface wave velocities are typically frequency dependent.

Processing the occurrence of multiple surface wave modes at given frequencies in the vertically stratified media may be performed to obtain a highly accurate geophysical model of the shallowest formations (i.e., formation depths in a range of meters to tens of meters into the sub-surface, depending on the frequency) combining forward modelling and inversion techniques to help analyze the returns.

Because shear wave velocity is directly related to shear modulus of a particular material, the analysis can be directed at retrieving information about the dynamic characteristics of the formations in the near surface Knowledge of the overburden can be used to filter any noise and to correct for any dominant anomaly which may influence the steering of the beams.

In performing a method according to the invention it may be desirable to form as many beams as required to sweep a particular targeted geological feature in the subsurface The resulting images and seismic attributes thus formed at a given location (at a beam focusing point or area of interest in the sub surface which one wishes to specifically illuminate) will have as many independent points as there are independent beams formed.

In some examples it may be desirable to use iterative focusing strategies to enhance and improve the focusing and thereby further our knowledge of the geology of the environment. One example of such iterative focusing may include illuminating specific points or areas in the subsurface from different angles, for example by using the auxiliary source as explained above.

To mitigate the influence of the beam's sidelobes and to improve the detectability of reflected signal returns on the main beams, the beams should be shaded using routine shading techniques such as the Hann and/or Chebyshev window techniques. Such techniques are described, for example, in, George, J., *Beamforming with Dolph-Chebyshev Optimization and Other Conventional Methods*, Naval Oceanographic and Atmospheric Research Lab, Stennis Space Center (1991). In such examples, once specific targeted features in the subsurface are detected it is possible to improve the lateral definition of the beam by removing the shading gradient applied.

As explained above with reference to FIG. 1A, the time delay for operating each transmitter or energy source in the array may be selected so that the output of the source is primarily directed towards a specific point of interest.

In addition, and as explained above, an auxiliary source may be disposed at a position on the water bottom directly above a point of interest in order to obtain near zero incidence illumination of the point of interest and hence augment the angular return to the receiving array. To augment the velocity values for various subsurface stratigraphies, the auxiliary source can be deployed at multiple selected locations. New times of arrival of signals from the subsurface can be logged in. The specific capturing of the shear wave velocity at a geological feature can be performed and a ratio between $V_S/V_P$ can be produced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic surveying, comprising:
    disposing a plurality of seismic sensors in a selected pattern above an area of the Earth's subsurface to be evaluated;
    repeatedly actuating a seismic energy source proximate the seismic sensors;
    recording signals generated by the seismic sensors indexed in time with respect to each actuation of the seismic energy source; and
    processing the recorded signals to generate an image corresponding to at least one point in the subsurface, the processing including stacking recordings from each sensor for a plurality of actuations of the source and beam steering a response of the seismic sensors such that the at least one point is equivalent to a focal point of a response of the plurality of sensors.

2. The method of claim 1 wherein the selected pattern comprises lines of sensors radially extending from a center point of an array.

3. The method of claim 1 wherein a number of seismic sensors in the selected pattern and a longitudinal spacing between seismic sensors are related to a maximum seismic energy frequency to be detected from the subsurface.

4. The method of claim 1 further comprising directing energy from the seismic energy source toward a selected point in the subsurface.

5. The method of claim 4 wherein the directing comprises actuating each of a plurality of individual seismic energy sources at a time causing an output thereof to be directed substantially toward the selected point.

6. The method of claim 1 wherein the beam steering comprises adding a selected time delay to the recording from each seismic sensor.

7. The method of claim 6 wherein the selected time delay is calculated from seismic velocity distribution determined by a previously performed seismic survey velocity analysis.

8. The method of claim 1 wherein each seismic sensor comprises three mutually orthogonal particle motion sensing elements and a substantially collocated pressure responsive sensing element.

9. The method of claim 1 wherein the seismic energy source is substantially collocated with a center of the selected pattern.

10. The method of claim 1 further comprising positioning an auxiliary seismic energy source substantially directly above a selected point in the subsurface, actuating the auxiliary seismic energy source and recording signals generated by the seismic sensors in response thereto.

11. The method of claim 1 further comprising determining a spatial distribution of at least one constituent of a subsurface reservoir from the processed recorded signals, repeating the repeated actuation, recording and processing after a selected time period, and determining a change in the spatial distribution of at least one constituent from the repeated processing.

12. The method of claim 1 wherein the seismic energy source and the plurality of sensors are substantially stationary during performance of the method.

13. The method of claim 1 further comprising using a velocity distribution determined from seismic data, generating a ray tracing model of focusing beams for the seismic sensors to a selected depth may be initiated.

14. The method of claim 13 wherein the ray tracing model is used to correct for influence of near surface formations on a resultant beam profiles.

15. The method of claim 1 further comprising shading the steered beams to mitigate the influence of beam sidelobes and to improve detectability of reflected signal returns.

16. The method of claim 15 wherein the shading is performed by a gradient window techniques.

17. The method of claim 15 further comprising detecting specific features in the subsurface and thereafter removing applied beam shading to improve a lateral definition of the steered beam.

* * * * *